(12) United States Patent
Saito et al.

(10) Patent No.: US 9,334,188 B2
(45) Date of Patent: May 10, 2016

(54) METHOD FOR PROCESSING GLASS PLATE

(71) Applicant: ASAHI GLASS COMPANY, LIMITED, Chiyoda-ku (JP)

(72) Inventors: Isao Saito, Tokyo (JP); Takahiro Nagata, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 14/587,284

(22) Filed: Dec. 31, 2014

(65) Prior Publication Data

US 2015/0114044 A1   Apr. 30, 2015

Related U.S. Application Data

(63) Continuation of application No. PCT/JP2013/068282, filed on Jul. 3, 2013.

(30) Foreign Application Priority Data

Jul. 10, 2012 (JP) ................................ 2012-154968
Mar. 7, 2013 (JP) ................................ 2013-045102

(51) Int. Cl.
| C03B 33/02 | (2006.01) |
| C03B 33/07 | (2006.01) |
| C03B 33/04 | (2006.01) |
| C03B 33/033 | (2006.01) |

(52) U.S. Cl.
CPC ............. *C03B 33/0222* (2013.01); *C03B 33/04* (2013.01); *C03B 33/07* (2013.01); *C03B 33/033* (2013.01)

(58) Field of Classification Search
CPC ..................... C03B 33/0222; C03C 23/0025
USPC ............................................... 65/112
See application file for complete search history.

(56) References Cited

U.S. PATENT DOCUMENTS

| 2006/0137505 A1 | 6/2006 | Wakayama | |
| 2006/0201983 A1 | 9/2006 | Kusama et al. | |
| 2011/0250423 A1* | 10/2011 | Fukasawa | B28D 5/04 428/220 |
| 2012/0135847 A1 | 5/2012 | Fukasawa et al. | |
| 2013/0068736 A1* | 3/2013 | Mielke | B23K 26/38 219/121.71 |
| 2013/0323469 A1* | 12/2013 | Abramov | C03B 33/0222 428/155 |
| 2015/0075222 A1* | 3/2015 | Mader | B23K 26/009 65/112 |
| 2015/0140241 A1* | 5/2015 | Hosseini | B23K 26/0057 428/34.4 |

FOREIGN PATENT DOCUMENTS

| JP | 5-305467 | 11/1993 |
| JP | 2005-81715 | 3/2005 |

(Continued)

OTHER PUBLICATIONS

International Search Report issued in PCT/JP2013/068282, dated Sep. 17, 2013.

*Primary Examiner* — Russell Kemmerle, III
(74) *Attorney, Agent, or Firm* — Oblon, McClelland, Maier & Neustadt, L.L.P.

(57) ABSTRACT

A method for processing a glass sheet includes a scribing step of heating a part of a glass sheet with laser light which is transmitted through the glass sheet from a first main surface of the glass sheet to a second main surface of the glass sheet, and moving an irradiation position of the laser light on the glass sheet, thereby forming a scribe line on at least the second main surface of the glass sheet.

17 Claims, 8 Drawing Sheets

(56) References Cited

FOREIGN PATENT DOCUMENTS

| | | |
|---|---|---|
| JP | 2005-179154 | 7/2005 |
| JP | 2005-132694 | 5/2008 |
| JP | 2009-274951 | 11/2009 |
| JP | 2012-006320 | 1/2012 |
| WO | WO 2010/074091 * 1/2010 | ............ C03B 33/04 |

* cited by examiner

METHOD FOR PROCESSING GLASS PLATE

TECHNICAL FIELD

The present invention relates to a method for processing a glass sheet.

BACKGROUND ART

As a method for processing a glass sheet, a method of forming a scribe line on a glass sheet and then applying an external force to the glass sheet to cut the glass sheet along the scribe line is known (for example, refer to Patent Document 1).

CITATION LIST

Patent Literature

Patent Document 1: JP-A-2012-6320

SUMMARY OF INVENTION

Technical Problem

A scribe line is formed by thermal stress which is generated in the glass sheet by heating the glass sheet with laser light. In the related art, a scribe line is formed on an incident surface of the laser light in a glass sheet, and it is necessary to turn the glass sheet over after the formation of the scribe line.

The present invention has been made in consideration of the above-described problem, and an object thereof is to provide a method for processing a glass sheet, which is capable of cutting a glass sheet without turning the glass sheet over after the formation of a scribe line.

Solution to Problem

The present invention provides the following method for processing a glass sheet.

(1) A method for processing a glass sheet, comprising:
a scribing step of heating a part of a glass sheet with laser light which is transmitted through the glass sheet from a first main surface of the glass sheet to a second main surface of the glass sheet, and moving an irradiation position of the laser light on the glass sheet, thereby forming a scribe line on at least the second main surface of the glass sheet.

(2) The method for processing a glass sheet according to (1),
wherein in the scribing step, a part of the second main surface of the glass sheet is heated with the laser light to be expanded, and the scribe line is formed on the second main surface of the glass sheet by a tensile stress of the part expanded.

(3) The method for processing a glass sheet according to (1) or (2),
wherein in the scribing step, by the laser light which is transmitted through the glass sheet from the first main surface of the glass sheet to the second main surface of the glass sheet, the scribe line is formed on the second main surface of the glass sheet and a scribe line is formed on the first main surface of the glass sheet.

(4) The method for processing a glass sheet according to (3),
wherein an initial crack which is an origin of the scribe line is formed on at least one of: both surfaces including the first main surface of the glass sheet and the second main surface of the glass sheet; and an end surface of the glass sheet.

(5) The method for processing a glass sheet according to (1) or (2),
wherein in the scribing step, by the laser light which is transmitted through the glass sheet from the first main surface of the glass sheet to the second main surface of the glass sheet, the scribe line is formed on only the second main surface of the glass sheet and the second main surface of the glass sheet.

(6) The method for processing a glass sheet according to (5),
wherein an initial crack which is an origin of the scribe line is formed on the end surface of the glass sheet, and a ratio ($P1/P2$) of a power density ($P1$) of the laser light on the first main surface of the glass sheet to a power density ($P2$) of the laser light on the second main surface of the glass sheet is less than 1.0.

(7) The method for processing a glass sheet according to (6),
wherein the ratio ($P1/P2$) of the power density ($P1$) of the laser light on the first main surface of the glass sheet to the power density ($P2$) of the laser light on the second main surface of the glass sheet is 0.001 or more.

(8) The method for processing a glass sheet according to (5),
wherein an initial crack which is an origin of the scribe line is formed on only a part of the glass sheet which is positioned inside an outer periphery of the second main surface.

(9) The method for processing a glass sheet according to any one of (1) to (8), wherein in the scribing step, by the laser light which is transmitted through a plurality of glass sheets from respective first main surfaces of the plurality of glass sheets to respective second main surfaces of the plurality of glass sheets, scribe lines are simultaneously formed on at least the respective second main surfaces of the plurality of glass sheets.

(10) The method for processing a glass sheet according to any one of (1) to (9), wherein in the scribing step, a plurality of scribe lines which intersect with each other are formed.

(11) The method for processing a glass sheet according to any one of (1) to (10), wherein in the scribing step, a scribe line having a plurality of parts which intersect with each other is formed.

(12) The method for processing a glass sheet according to any one of (1) to (11), wherein a wavelength of the laser light is 250 nm to 5000 nm.

(13) The method for processing a glass sheet according to any one of (1) to (12), wherein a shape of the laser light on the second main surface of the glass sheet is circular.

Advantageous Effects of Invention

According to the present invention, a method for processing a glass sheet, which is capable of cutting a glass sheet without turning the glass sheet over after the formation of a scribe line, is provided.

DESCRIPTION OF EMBODIMENTS

Figure 1:
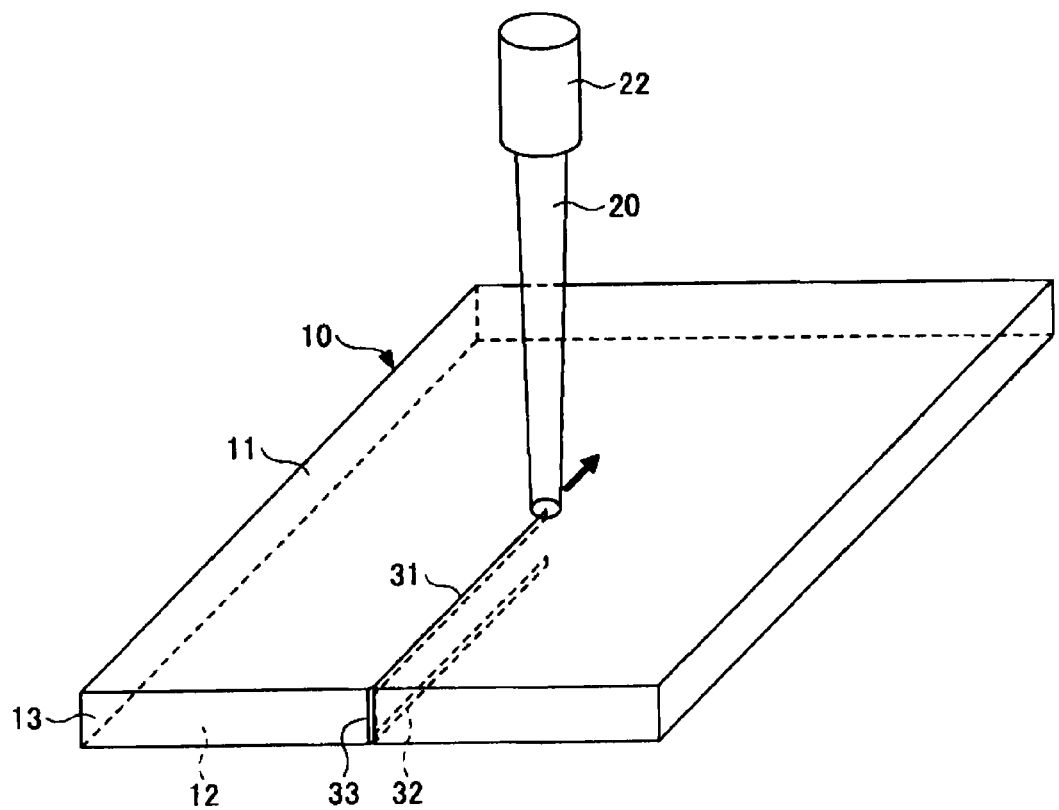
FIG. 1 is a figure illustrating a method for processing a glass sheet according to a first embodiment of the present invention.

Hereinafter, embodiments of the present invention will be described with reference to the drawings. In each of the drawings, the same or corresponding components are represented by the same or corresponding reference numerals, and the description thereof will not be repeated.

[First Embodiment]

In this embodiment, a method of forming scribe lines on an upper surface which is a first main surface of a glass sheet, and a lower surface which is a second main surface of the glass sheet, respectively, will be described. A method of forming a scribe line on only the lower surface of the upper and lower surfaces of the glass sheet will be described in a second embodiment and a third embodiment.

Figure 2:
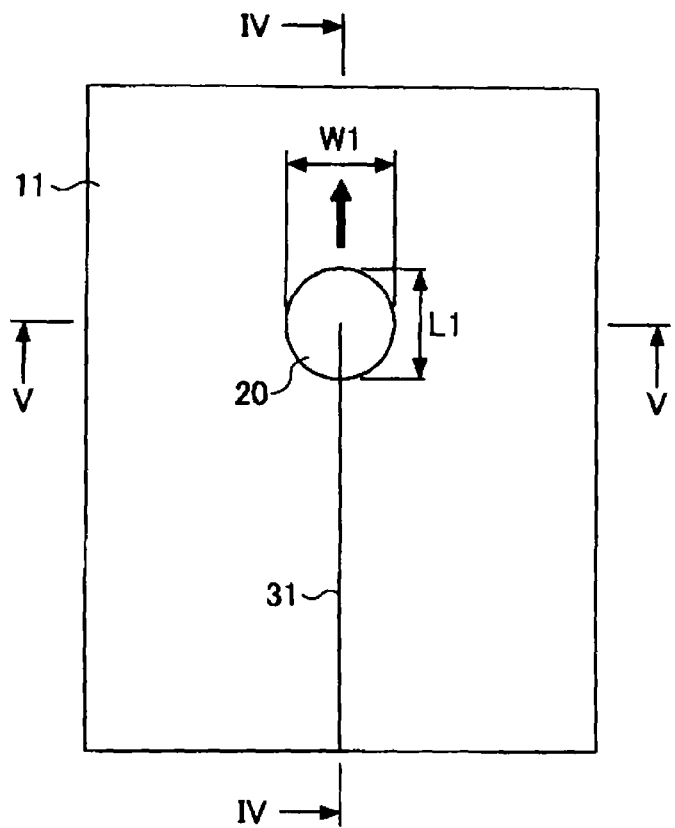
FIG. 2 is a figure illustrating an irradiation shape of laser light on an upper surface of the glass sheet in FIG. 1.
Figure 3:
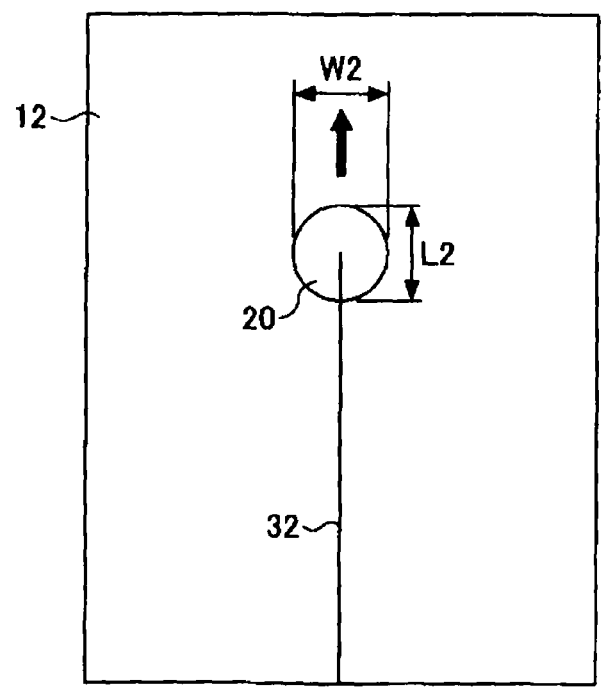
FIG. 3 is a figure illustrating an irradiation shape of laser light on a lower surface of the glass sheet in FIG. 1.
Figure 4:
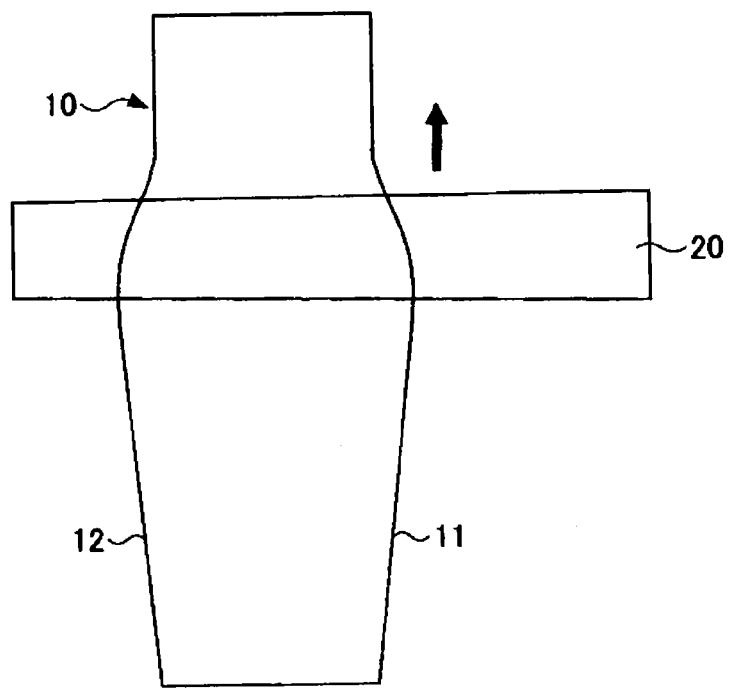
FIG. 4 is a cross-sectional view taken along line IV-IV in FIG. 2.
Figure 5:
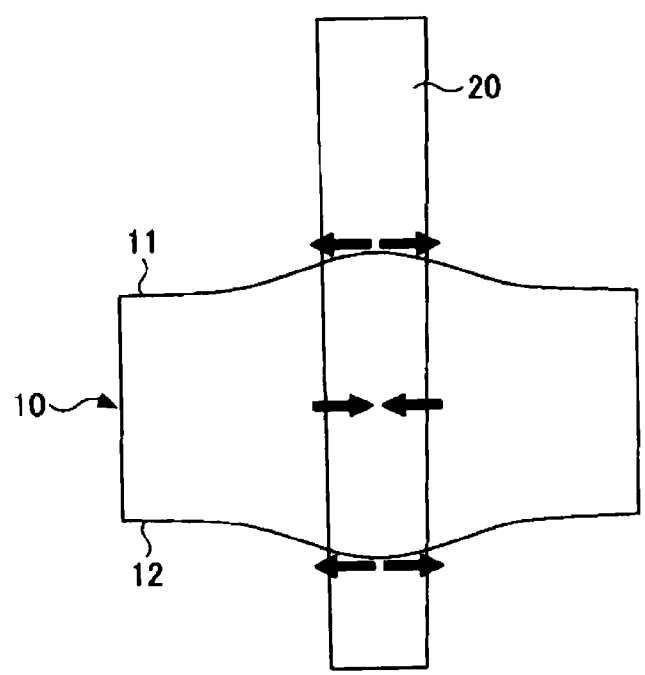
FIG. 5 is a cross-sectional view taken along line V-V in FIG. 2.

FIG. 1 is a figure illustrating the method for processing a glass sheet according to the first embodiment of the present invention. FIG. 2 is a figure illustrating an irradiation shape of laser light on the upper surface of the glass sheet in FIG. 1. FIG. 3 is a figure illustrating an irradiation shape of laser light on the lower surface of the glass sheet in FIG. 1. FIG. 4 is a cross-sectional view taken along line IV-IV in FIG. 2. FIG. 5 is a cross-sectional view taken along line V-V in FIG. 2. In FIGS. 1 to 4, an arrow direction represents a moving direction of an irradiation position of laser light on the glass sheet. In FIG. 5, arrow directions represent directions of applying a stress. In FIGS. 4 and 5, thermal deformation of the glass sheet is exaggeratedly illustrated. The thermal deformation state of the glass sheet can be confirmed by finite element analysis.

The method for processing a glass sheet includes a scribing step of forming scribe lines 31 and 32 on a glass sheet 10. The type of glass of the glass sheet 10 is not particularly limited, and examples thereof include soda-lime glass, alkali-free glass and the like. The thickness of the glass sheet 10 is appropriately set according to the use of the glass sheet 10 and is, for example, 0.005 cm to 2.5 cm. The glass sheet 10 may not be subjected to a strengthening treatment.

In the scribing step, the glass sheet 10 is locally heated with laser light 20 which is transmitted through the glass sheet 10 from an upper surface 11 of the glass sheet 10 to a lower surface 12 of the glass sheet 10, and an irradiation position of the laser light 20 on the glass sheet 10 is moved. Due to thermal stress generated in the glass sheet 10, the scribe line 31 is formed on the upper surface 11 of the glass sheet 10, and the scribe line 32 is also formed on the lower surface 12 of the glass sheet 10. As a result, the glass sheet 10 can be cut by applying an external force to the glass sheet 10 without turning the glass sheet 10 over. For example, the glass sheet 10 is placed on an elastic body without being turned over, and the glass sheet 10 is pressed from above. As a result, tensile stress is generated in the lower surface 12 of the glass sheet 10, and the glass sheet 10 can be cut along the scribe line 32.

Here, "upper surface" refers to an upward-facing surface and may be either a horizontal surface or an inclined surface which is inclined to the horizontal surface. Here, "lower surface" refers to a downward-facing surface and may be either a horizontal surface or an inclined surface which is inclined to the horizontal surface.

In addition, in this embodiment, the scribe line 31 is formed also on the upper surface 11 of the glass sheet 10. Therefore, cutting accuracy on the upper surface 11 and lower surface 12 of the glass sheet 10 is high.

Further, in this embodiment, the scribe lines are simultaneously formed on the upper surface 11 and lower surface 12 of the glass sheet 10 with the single laser light 20. Therefore, a positional relationship between the scribe lines formed on the upper surface 11 and lower surface 12 of the glass sheet 10 is likely to be a desired positional relationship. For example, when the laser light 20 is entered to the glass sheet 10 perpendicularly to the upper surface 11, the scribe line 31 formed on the upper surface 11 of the glass sheet 10 and the scribe line 32 formed on the lower surface 12 of the glass sheet 10 are likely to overlap each other when seen from a direction perpendicular to the upper surface 11 of the glass sheet 10. Accordingly, a cut surface of the glass sheet 10 is likely to be perpendicular to the upper surface 11 or lower surface 12 of the glass sheet 10.

An initial crack 33 which is an origin of the scribe lines 31 and 32 may be formed in advance on an end surface 13 of the glass sheet 10, for example, as illustrated in FIG. 1. The initial crack 33 may reach the upper surface 11 or lower surface 12 of the glass sheet 10, or may be formed on the upper surface 11 or lower surface 12 of the glass sheet 10. The initial crack 33 is the origin which is common to the scribe lines 31 and 32.

When the initial crack is formed on the end surface 13 of the glass sheet 10, the initial crack may reach only the upper surface 11 of the glass sheet 10, may reach only the lower surface 12 of the glass sheet 10, or may reach the upper surface 11 and lower surface 12 of the glass sheet 10. The initial crack may be formed on each of the upper surface 11 and lower surface 12 of the glass sheet 10. In this case, the initial crack may reach or may not reach the end surface 13. The initial crack only has to be formed on at least one of both surfaces including the upper surface 11 and lower surface 12 of the glass sheet 10 and the end surface 13 of the glass sheet 10.

A method of forming the initial crack 33 may be a general method such as a method using a cutter, a file, a laser or the like. When the end surface 13 of the glass sheet 10 is ground by a grind stone, a micro crack formed by grinding can be used as the initial crack.

A part of the upper surface 11 of the glass sheet 10 is heated with the laser light 20 and, as illustrated in FIGS. 4 and 5, the part is upwardly expanded to be symmetrical centering on the movement locus of the irradiation position of the laser light 20. In the upwardly expanded convex part, tensile stress is generated in a direction perpendicular to the moving direction of the irradiation position of the laser light 20. Due to this tensile stress, the crack which is made from the origin of the initial crack 33 propagates along the movement locus of the irradiation position of the laser light 20, and thus the scribe line 31 is formed. A front end of the scribe line 31 is present at the irradiation position of the laser light 20 or in the vicinity of the forward position thereof on the upper surface 11 of the glass sheet 10.

Likewise, a part of the lower surface 12 of the glass sheet 10 is heated with the laser light 20 and, as illustrated in FIGS. 4 and 5, the part is downwardly expanded to be symmetrical centering on the movement locus of the irradiation position of the laser light 20. In the downwardly expanded convex part, tensile stress is generated in a direction perpendicular to the moving direction of the irradiation position of the laser light 20. Due to this tensile stress, the crack which is made from the origin of the initial crack 33 propagates along the movement locus of the irradiation position of the laser light 20, and thus the scribe line 32 is formed. A front end of the scribe line 32 is present at the irradiation position of the laser light 20 or in the vicinity of the forward position on the lower surface 12 of the glass sheet 10.

The scribe line 31 formed on the upper surface 11 of the glass sheet 10 and the scribe line 32 formed on the lower surface 12 of the glass sheet 10 extend along with the movement of the irradiation position of the laser light 20 on the glass sheet 10. The irradiation position of the laser light 20 on the glass sheet 10 is moved along with the movement or rotation of a support of the glass sheet 10 relative to a frame of a cutting machine or along with the movement of a light source 22 of the laser light 20, or may be moved along with the movement or rotation of the support medium and along with the movement of the light source 22. In addition, the irradiation position of the laser light 20 on the glass sheet 10 may be moved along with the rotation of a galvano mirror from which the laser light 20 emitted from the light source 22 is reflected to the glass sheet 10.

Whether or not the scribe line can be formed on each of the upper surface 11 and lower surface 12 of the glass sheet 10 is determined mainly based on a formation position of the initial crack 33 and irradiation conditions of the laser light 20. Examples of the irradiation conditions of the laser light 20 include (1) the output of the light source 22, (2) the transmittance of the laser light 20 with respect to the glass sheet 10, (3) the irradiation shape of the laser light 20 on the upper surface 11 or lower surface 12 of the glass sheet 10, and (4) a ratio (P1/P2) of a power density (P1) of the laser light 20 on the upper surface 11 of the glass sheet 10 to a power density (P2) of the laser light 20 on the lower surface 12 of the glass sheet 10.

In a case where the intensity of the laser light 20 on the upper surface 11 of the glass sheet 10 is $I_0$ and the intensity of the laser light 20 when being moved in the glass sheet 10 for a distance (D) (unit: cm) is I, an equation $I=I_0 \times \exp(-\alpha \times D)$ is satisfied. This equation is the so-called Lambert-Beer law. "α" expresses an absorption coefficient (unit: $cm^{-1}$) of the glass sheet 10 with respect to the laser light 20 and is determined based on, for example, the wavelength of the laser light 20 and the chemical composition of the like of the glass sheet 10. "α" is measured by, for example, a UV-visible near-infrared spectrophotometer.

A product (α×M) between the absorption coefficient (α) (unit: $cm^{-1}$) of the glass sheet 10 with respect to the laser light 20 and a distance (M) (unit: cm) in which the laser light 20 is moved from the upper surface 11 to lower surface 12 of the glass sheet 10 is preferably more than 0 and 3.0 or less. When the value of α×M is within this range, the internal transmittance of the laser light 20 with respect to the glass sheet 10 is high, and the lower surface 12 of the glass sheet 10 can be sufficiently heated. The value of α×M is more preferably 0.3 or less (internal transmittance: 74% or more) and further more preferably 0.105 or less (internal transmittance: 90% or more). When the value of α×M is too small, the internal transmittance is too high, and the absorbed efficiency is too low. Therefore, the value of α×M is preferably 0.0005 or more (internal transmittance: 99.95% or less), more preferably 0.002 or more (internal transmittance: 99.8% or less), and further more preferably 0.004 or more (internal transmittance: 99.6% or less). The internal transmittance is a transmittance when it is assumed that there is no reflection on the upper surface 11 of the glass sheet 10.

The heating temperature of the glass sheet 10 may be a temperature lower than or equal to the annealing point of the glass. When the temperature of the glass is higher than the annealing point of the glass, the glass viscously flows, thermal stress is relaxed, and it is difficult to form the scribe lines 31 and 32.

When the laser light 20 is entered to the glass sheet 10 perpendicularly to the upper surface 11, the distance (M) in which the laser light 20 is moved from the upper surface 11 to lower surface 12 of the glass sheet 10 is the same as the thickness (t) of the glass sheet 10. On the other hand, when the laser light 20 is obliquely entered to the glass sheet 10 from the upper surface 11, the laser light 20 is refracted in accordance with Snell's law of refraction. Therefore, when a refraction angle is represented by γ, the distance (M) in which the laser light 20 is moved from the upper surface 11 to lower surface 12 of the glass sheet 10 is approximately obtained by an equation $M=t/\cos\gamma$.

As the light source 22, for example, laser of near-infrared rays having a wavelength of 800 nm to 1100 nm (hereinafter, simply referred to as "near-infrared rays") is used. Examples of the near-infrared laser include a Yb fiber laser (wavelength: 1000 nm to 1100 nm), a Yb disk laser (wavelength: 1000 nm to 1100 nm), a Nd:YAG laser (wavelength: 1064 nm), and a high-output semiconductor laser (wavelength: 808 nm to 980 nm). These near-infrared lasers exhibit high output and are inexpensive, and the value of α×M is easily adjusted to be in a desired range in the case of these lasers.

In this embodiment, as the light source 22, the near-infrared laser which has high output and is inexpensive is used, but a light source having a wavelength of 250 nm to 5000 nm may also be used. Examples of such a light source include a UV laser (wavelength: 355 nm), a green laser (wavelength: 532 nm), a Ho:YAG laser (wavelength: 2080 nm), a Er:YAG laser (2940 nm), a laser using a mid-infrared light parametric amplifier (wavelength: 2600 nm to 3450 nm) and the like. The oscillating method of the laser light 20 is not limited and both a CW laser which continuously oscillates the laser light and a pulse laser which intermittently oscillates the laser light may be used. Further, the intensity distribution of the laser light 20 is not limited and may be a Gaussian type or a Top Hat type.

In the case of the near-infrared laser, as the content of iron (Fe), content of cobalt (Co) and content of the copper (Cu) in the glass sheet 10 become larger, the absorption coefficient (α) becomes larger. In addition, in this case, as the content of a rare earth element (for example, Yb) in the glass sheet 10 becomes greater, the absorption coefficient (α) near an absorbed wavelength of the rare earth element becomes greater. In order to adjust the absorption coefficient (α), iron is used from the viewpoints of transparency and cost of the glass. Cobalt, copper, and a rare earth element may not be substantially contained in the glass sheet 10.

As a dimension W1 of the laser light 20 on the upper surface 11 of the glass sheet 10 in a direction perpendicular to the moving direction decreases, an upwardly expanded convex part is sharp, and tensile stress in the direction perpendicular to the moving direction of the laser light 20 is high. Similarly, as a dimension W2 of the laser light 20 on the lower surface 12 of the glass sheet 10 in a direction perpendicular to the moving direction of the laser light 20 decreases, an downwardly expanded convex part is sharp, and tensile stress in the direction perpendicular to the moving direction of the laser light 20 is high.

Therefore, it is preferable that the dimension W1 of the laser light 20 on the upper surface 11 of the glass sheet 10 in the direction perpendicular to the moving direction be 75% or less of the thickness of the glass sheet 10. In addition, it is preferable that the dimension W2 of the laser light 20 on the lower surface 12 of the glass sheet 10 in the direction perpendicular to the moving direction be 75% or less of the thickness of the glass sheet 10. The upwardly expanded convex part of the upper surface 11 of the glass sheet 10 and the downwardly expanded convex part of the lower surface 12 of the glass sheet 10 are sufficiently sharp, and sufficient tensile stress for forming the scribe lines on the upper surface 11 and lower surface 12 of the glass sheet 10 is generated. On the other hand, compression stress is generated inside the glass sheet 10 and the scribe line 31 formed on the upper surface 11 of the glass sheet 10 and the scribe line 32 formed on the lower surface 12 of the glass sheet 10 can be prevented from being connected to each other. In addition, tensile stress is generated at the irradiation position of the laser light 20 on the upper surface 11 or lower surface 12 of the glass sheet 10. Therefore, unlike the cases in the related art, in order to generate tensile stress, it is not necessary to cool the vicinity of the backward position of the irradiation position of the glass sheet 10. Here, in order to easily design a laser optical system, it is preferable that the dimension W1 on the upper surface 11 of the glass sheet 10 in the direction perpendicular to the moving direction and the dimension W2 on the lower surface 12 of the glass sheet 10 in the direction perpendicular to the moving direction be greater than or equal to the wavelength of the laser light.

A dimension L1 of the laser light 20 on the upper surface 11 of the glass sheet 10 in the moving direction and a dimension L2 of the laser light 20 on the lower surface 12 of the glass sheet 10 in the moving direction are not particularly limited, respectively. As L1 and L2 become shorter, the curved scribe lines 31 and 32 can be more easily formed. In addition, when L1 and L2 are long, and when the heating time at a specific position of the glass sheet 10 is the same, a speed of moving the irradiation position of the laser light 20 on the glass sheet 10 is high, and the scribe lines 31 and 32 can be formed within a short period of time.

The irradiation shape of the laser light 20 on the upper surface 11 or lower surface 12 of the glass sheet 10 may be a wide variety of shapes but is preferably circular. When a curved part of the scribe lines is formed, the width of the locus of the irradiation position of the laser light 20 is fixed, and the positional accuracy of the scribe lines is high.

While the laser light 20 is transmitted through the glass sheet 10 from the upper surface 11 of the glass sheet 10 to the lower surface 12 of the glass sheet 10, the intensity (W) of the laser light 20 is attenuated in accordance with the Lambert-Beer law. The temperature of a part of the glass sheet 10 through which the laser light 20 is transmitted is determined mainly based on, for example, the power density (unit: W/cm$^2$) of the laser light 20.

Accordingly, the ratio (P1/P2) of the power density (P1) of the laser light 20 on the upper surface 11 of the glass sheet 10 to the power density (P2) of the laser light 20 on the lower surface 12 of the glass sheet 10 is preferably 0.5 to 2.0. P1/P2 is calculated from an equation P1/P2=S2/S1/exp(−α×M). S1 represents the irradiation area of the laser light 20 on the upper surface 11 of the glass sheet 10, and S2 represents the irradiation area of the laser light 20 on the lower surface 12 of the glass sheet 10. When P1/P2 is 0.5 to 2.0, the temperature of the irradiation position of the laser light 20 on the upper surface 11 of the glass sheet 10 is equal to the temperature of the irradiation position of the laser light 20 on the lower surface 12 of the glass sheet 10. Accordingly, the upwardly expanded convex part on the upper surface 11 of the glass sheet 10 and the downwardly expanded convex part on the lower surface 12 of the glass sheet 10 are sharp to the same degree. As a result, the depth of the scribe line 31 formed on the upper surface 11 of the glass sheet 10 is the same as the depth of the scribe line 32 formed on the lower surface 12 of the glass sheet 10. P1/P2 is more preferably 0.6 or more and further more preferably 0.67 or more. In addition, P1/P2 is more preferably 1.67 or less and further more preferably 1.5 or less.

In order to adjust a ratio (S1/S2) of the irradiation area (S1) of the laser light 20 on the upper surface 11 of the glass sheet 10 and the irradiation area (S2) of the laser light 20 on the lower surface 12 of the glass sheet 10, for example, a condenser lens (not illustrated) is disposed between the light source 22 and the glass sheet 10. When a collection position of the laser light 20 is positioned below the glass sheet 10, S1/S2 is higher than 1.

The method for processing a glass sheet may further include a breaking step of applying an external force to the glass sheet 10 to cut the glass sheet 10 along the scribe lines 31 and 32. The glass sheet can be cut.

In the case of the cutting of the glass sheet 10 according to this embodiment, cutting accuracy on the upper surface 11 and lower surface 12 of the glass sheet 10 is superior as compared to the case of the full cut in the related art. The full cut in the related art refers to the cutting in which a glass sheet is irradiated with laser light, the backward position of an irradiation position thereof is cooled with a coolant, and a crack which penetrates the glass sheet 10 in a thickness direction of the glass sheet 10 is formed by tensile stress generated at the cooled position without forming the scribe lines. In this embodiment, tensile stress is generated at the irradiation position of the laser light 20 on the upper surface 11 and lower surface 12 of the glass sheet 10, and the scribe lines 31 and 32 are formed by the generated tensile stress. Accordingly, front end positions of the scribe lines 31 and 32 are close to the irradiation position of the laser light 20, and the positions of the scribe lines 31 and 32 are likely to match with the locus of the laser light 20. Accordingly, the positional accuracy of the scribe lines 31 and 32 formed on the upper surface 11 and lower surface 12 of the glass sheet 10 is high, and the cutting accuracy of the upper surface 11 and lower surface 12 of the glass sheet 10 is high.

Figure 6:
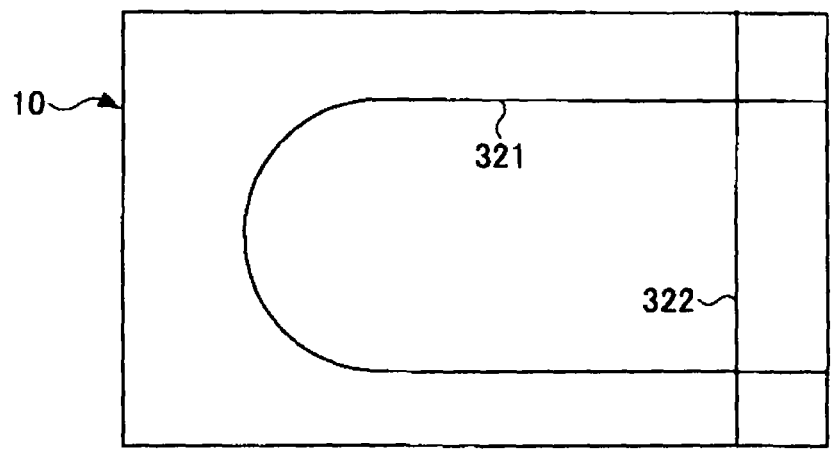
FIG. 6 is a diagram illustrating an example of a scribe line.
Figure 7:
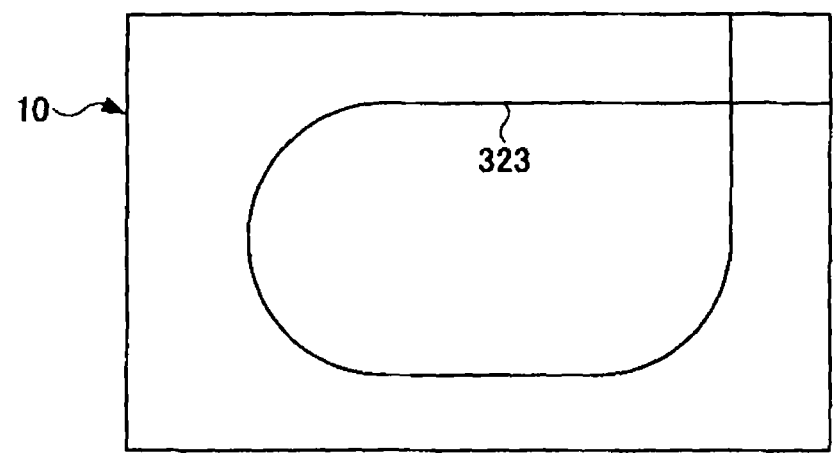
FIG. 7 is a diagram illustrating another example of a scribe line.

In the scribing step, as illustrated in FIG. 6, a plural of scribe lines 321 and 322 which intersect with each other may be formed. In this case, an initial crack is formed at the origin of each of the scribe lines 321 and 322 and is not formed at an intersection of the plural of the scribe lines 321 and 322. In addition, in the scribing step, as illustrated in FIG. 7, a scribe line 323 having a plural of parts which intersect with each other may also be formed. In this case, an initial crack is formed at a starting point of the scribe line 323 and is not formed near a part where a part of the scribe line 323 intersects with another part of the scribe line 323. Accordingly, in the example illustrated in FIG. 6 and the example illustrated in FIG. 7, the trace of the initial crack remains in a part (for example, an outer peripheral part of the glass sheet 10) which is not included in a product of the glass sheet 10, and the trace of the initial crack does not remain in a part which is not included in a product of the glass sheet 10.

[Second Embodiment]

In the first embodiment, the scribe lines are formed on the upper surface and lower surface of the glass sheet, respectively. On the other hand, this embodiment is different from the first embodiment, in that the scribe line is formed on only the lower surface of the upper and lower surfaces of the glass sheet. Hereinafter, this different point will be mainly described.

In this embodiment, the case where the initial crack 33 is formed on only the end surface 13 of the glass sheet 10 will be described. The case where the initial crack 33 is formed on only a part of the glass sheet 10 which is positioned inside an outer periphery of the lower surface 12 will be described in a third embodiment of the present invention.

Figure 8:
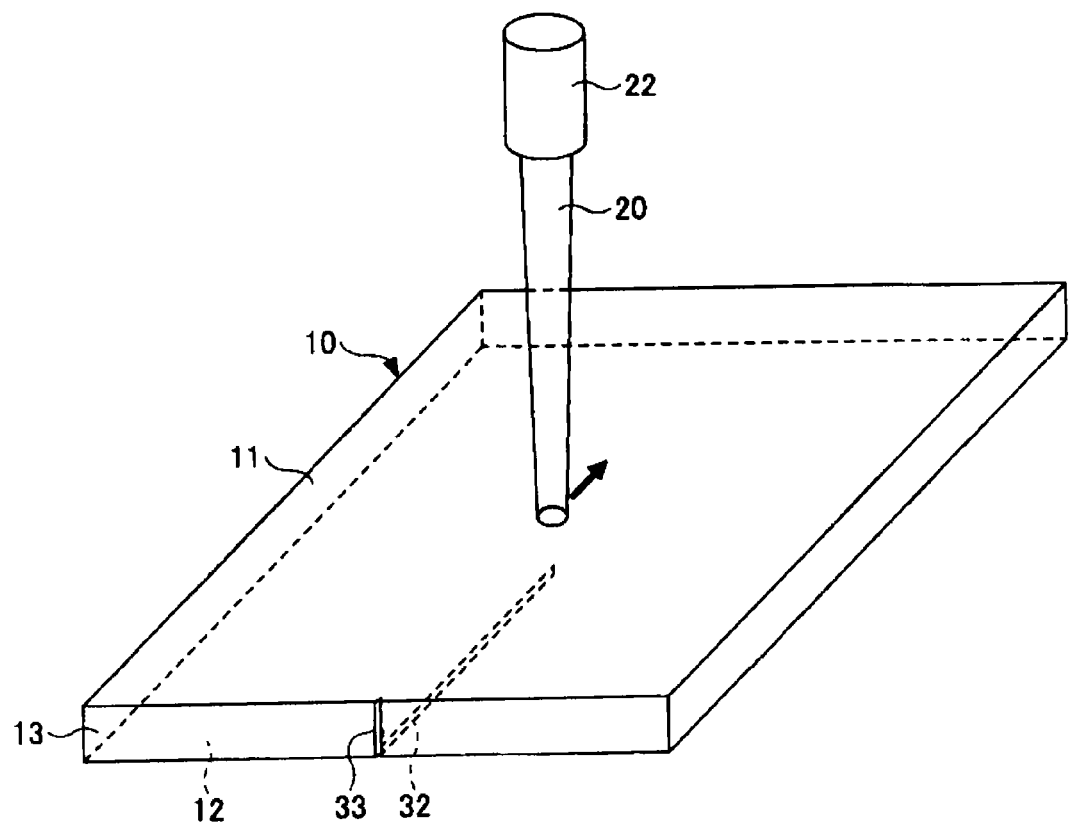
FIG. 8 is a figure illustrating a method for processing a glass sheet according to a second embodiment of the present invention.
Figure 9:
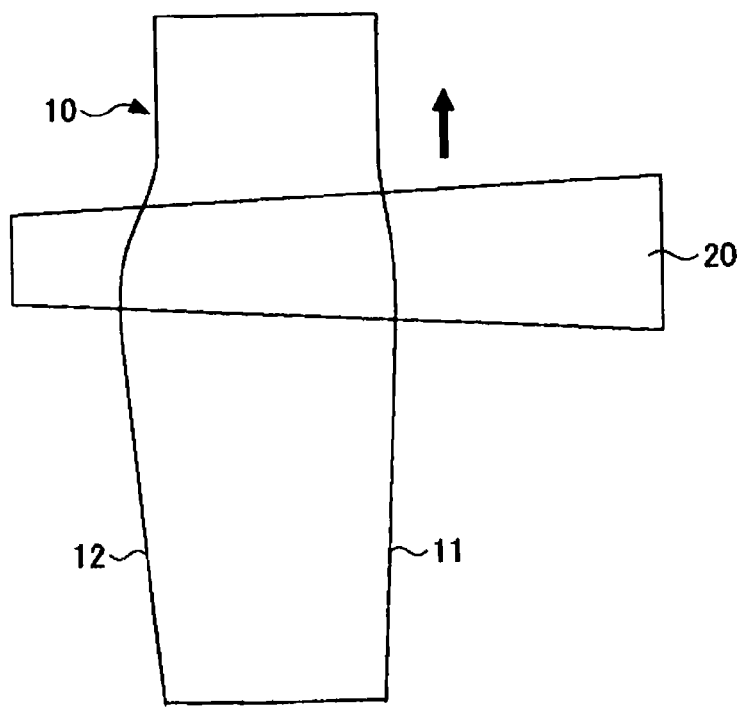
FIG. 9 is a cross-sectional view illustrating the glass sheet in FIG. 8 and corresponding to the case of FIG. 4.
Figure 10:
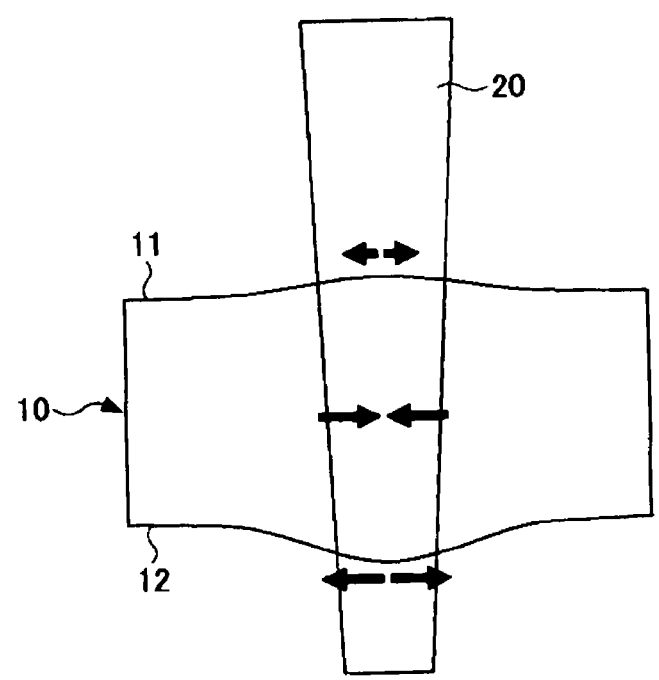
FIG. 10 is a cross-sectional view illustrating the glass sheet in FIG. 8 and corresponding to the case of FIG. 5.

FIG. 8 is a figure illustrating a method for processing a glass sheet according to the second embodiment of the present invention. FIG. 9 is a cross-sectional view illustrating the glass sheet in FIG. 8 and corresponding to the case of FIG. 4. FIG. 10 is a cross-sectional view illustrating the glass sheet in FIG. 8 and corresponding to the case of FIG. 5. In FIGS. 8 and 9, an arrow direction represents a moving direction of an irradiation position of laser light on the glass sheet. In FIG. 10, arrow directions represent directions of applying a stress. In FIGS. 9 and 10, thermal deformation of the glass sheet is exaggeratedly illustrated.

The method for processing a glass sheet includes a scribing step of forming the scribe line 32 on the glass sheet 10. In the scribing step, the glass sheet 10 is locally heated with the laser light 20 which is transmitted through the glass sheet 10 from the upper surface 11 of the glass sheet 10 to the lower surface 12 of the glass sheet 10, and the irradiation position of the laser light 20 on the glass sheet 10 is moved. Due to thermal stress generated in the glass sheet 10, the scribe line 32 is formed on only the lower surface 12 of the upper surface 11 and lower surface 12 of the glass sheet 10. As a result, the glass sheet 10 can be cut by applying an external force to the glass sheet 10 without turning the glass sheet 10 over. For example, the glass sheet 10 is placed on an elastic body without being turned over, and the glass sheet 10 is pressed from above. As a result, tensile stress is generated in the lower surface 12 of the glass sheet 10, and the glass sheet 10 can be cut along the scribe line 32.

The initial crack 33 which is the origin of the scribe line 32 is formed on the end surface 13 of the glass sheet 10 so as to reach the upper surface 11 or lower surface 12 of the glass sheet 10, as illustrated in FIG. 8. When the initial crack 33 is formed on the end surface 13 of the glass sheet 10, the initial crack 33 may reach only the upper surface 11 of the glass sheet 10 or may not reach the upper surface 11 and lower surface 12 of the glass sheet 10. However, it is preferable that the initial crack 33 reach the lower surface 12 of the glass sheet 10.

A part of the lower surface 12 of the glass sheet 10 is heated with the laser light 20 and, as illustrated in FIGS. 9 and 10, the part is downwardly expanded to be symmetrical centering on the movement locus of the irradiation position of the laser light 20. In the downwardly expanded convex part, tensile stress is generated in a direction perpendicular to the moving direction of the irradiation position of the laser light 20. Due to this tensile stress, the crack which is made from the origin of the initial crack 33 propagates along the movement locus of the irradiation position of the laser light 20, and thus the scribe line 32 is formed. A front end of the scribe line 32 is present at the irradiation position of the laser light 20 or in the vicinity of the front thereof on the lower surface 12 of the glass sheet 10. The scribe line 32 extends along with the movement of the irradiation position of the laser light 20 on the glass sheet 10.

It is preferable that the dimension W2 (refer to FIG. 3) of the laser light 20 on the lower surface 12 of the glass sheet 10 in the direction perpendicular to the moving direction be less than or equal to the thickness of the glass sheet 10. The downwardly expanded convex part of the lower surface 12 of the glass sheet 10 is sufficiently sharp, and sufficient tensile stress for forming the scribe line 32 on the lower surface 12 of the glass sheet 10 is generated. On the other hand, compression stress is generated inside the glass sheet 10. Tensile stress is generated at the irradiation position of the laser light 20 on the lower surface 12 of the glass sheet 10. Therefore, unlike the cases in the related art, in order to generate tensile stress, it is not necessary to cool the vicinity of the backward position of the irradiation position of the glass sheet 10 with the coolant. On the other hand, the upwardly expanded convex part of the upper surface 11 of the glass sheet 10 is gentle, and tensile stress is generated on the upper surface of 11 of the glass sheet 10 to the extent that the scribe line is not formed. Here, in order to easily design a laser optical system, it is preferable that the dimension W2 on the lower surface 12 of the glass sheet 10 in the direction perpendicular to the moving direction be greater than or equal to the wavelength of the laser light.

The dimension L2 of the laser light 20 on the lower surface 12 of the glass sheet 10 in the moving direction is not particularly limited. As L2 becomes shorter, the curved scribe line can be more easily formed. In addition, when L2 is long, and when the heating time at a specific position of the glass sheet 10 is the same, a speed of moving the irradiation position of the laser light 20 on the glass sheet 10 is high, and the scribe line 32 can be formed within a short period of time.

The irradiation shape of the laser light 20 on the lower surface 12 of the glass sheet 10 may be a wide variety of shapes but is preferably circular. When a curved part of the scribe lines is formed, the width of the locus of the irradiation position of the laser light 20 is fixed, and the positional accuracy of the scribe lines is high.

The ratio (P1/P2) of the power density (P1) of the laser light 20 on the upper surface 11 of the glass sheet 10 to the power density (P2) of the laser light 20 on the lower surface 12 of the glass sheet 10 is preferably less than 1.0. When P1/P2 is less than 1.0, the temperature of the irradiation position of the laser light 20 on the upper surface 11 of the glass sheet 10 is low, and the temperature of the irradiation position of the laser light 20 on the lower surface 12 of the glass sheet 10 is high. Accordingly, the downwardly expanded convex part on the lower surface 12 of the glass sheet 10 can be made to be sharper than the upwardly expanded convex part on the upper surface 11 of the glass sheet 10. Accordingly, the scribe line 32 is likely to be formed on only the lower surface 12 of the upper surface 11 and lower surface 12 of the glass sheet 10. P1/P2 is more preferably 0.95 or less, and further more preferably 0.9 or less. On the other hand, in order to easily design a laser optical system, P1/P2 is preferably 0.001 or more. P1/P2 is more preferably 0.002 or more and further more preferably 0.004 or more.

The method for processing a glass sheet may further include a breaking step of applying an external force to the glass sheet 10 to cut the glass sheet 10 along the scribe line 32. The glass sheet can be cut.

In the case of the cutting of the glass sheet 10 according to this embodiment, cutting accuracy on the lower surface 12 of the glass sheet 10 is superior as compared to the full cut in the related art.

[Third Embodiment]

This embodiment is the same as the second embodiment in that a scribe line is formed on only the lower surface of the upper and lower surfaces of the glass sheet. However, this embodiment is different from the second embodiment in that an initial crack is formed not on the end surface of the glass sheet but on only a part of the glass sheet which is positioned inside an outer periphery of the lower surface. Hereinafter, this different point will be mainly described.

Figure 11:
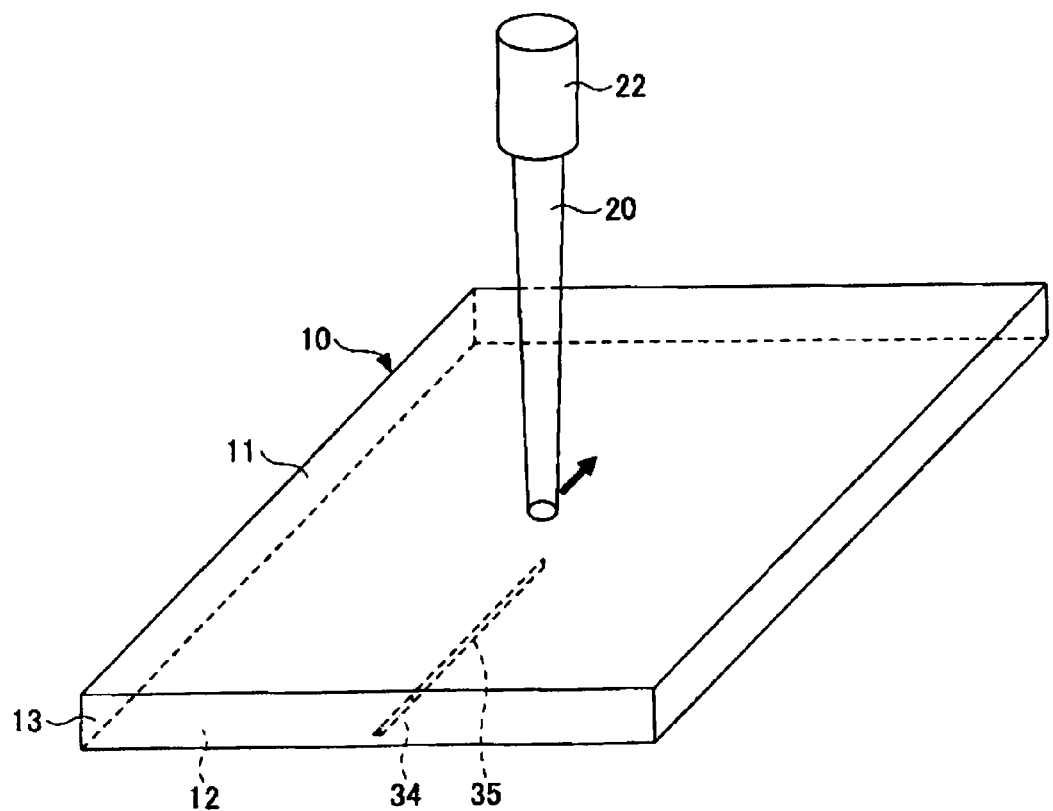
FIG. 11 is a figure illustrating a method for processing a glass sheet according to a third embodiment of the present invention.

FIG. 11 is a figure illustrating a method for processing a glass sheet according to the third embodiment of the present invention. As illustrated in FIG. 11, the method for processing a glass sheet includes a scribing step of forming a scribe line 35 on the glass sheet 10. In the scribing step, the glass sheet 10 is locally heated with the laser light 20 which is transmitted through the glass sheet 10 from the upper surface 11 of the glass sheet 10 to the lower surface 12 of the glass sheet 10, and the irradiation position of the laser light 20 on the glass sheet 10 is moved. Due to thermal stress generated in the glass sheet 10, the scribe line 35 is formed on only the lower surface 12 of the upper surface 11 and lower surface 12 of the glass sheet 10. As a result, the glass sheet 10 can be cut by applying an external force to the glass sheet 10 without turning the glass sheet 10 over.

An initial crack 34 which is the origin of the scribe line 35 is formed on only the part of the glass sheet 10 which is positioned inside the outer periphery of the lower surface 12 as illustrated in FIG. 11. The initial crack 34 does not reach the end surface 13 of the glass sheet 10 and is not formed on the end surface 13 and upper surface 11 of the glass sheet 10. Therefore, the scribe line 35 can be easily formed on only the lower surface 12 of the upper surface 11 and the lower surface 12 of the glass sheet 10, and laser irradiation conditions are wide. For example, when an inclination of an inclined surface of the upwardly expanded convex part on the upper surface 11 of the glass sheet 10 is almost equal to an inclination of an inclined surface of the downwardly expanded convex part on the lower surface 12 of the glass sheet 10, the scribe line 35 is likely to be formed on only the lower surface 12 of the upper surface 11 and lower surface 12 of the glass sheet 10.

[Fourth Embodiment]

This embodiment is different from the first embodiment, in that, in the first embodiment, the scribe lines are formed on the upper and lower surfaces of the single glass sheet; whereas, in this embodiment, scribe lines are simultaneously formed on respective upper and lower surfaces of a plural of glass sheets. Hereinafter, this different point will be mainly described.

Figure 12:
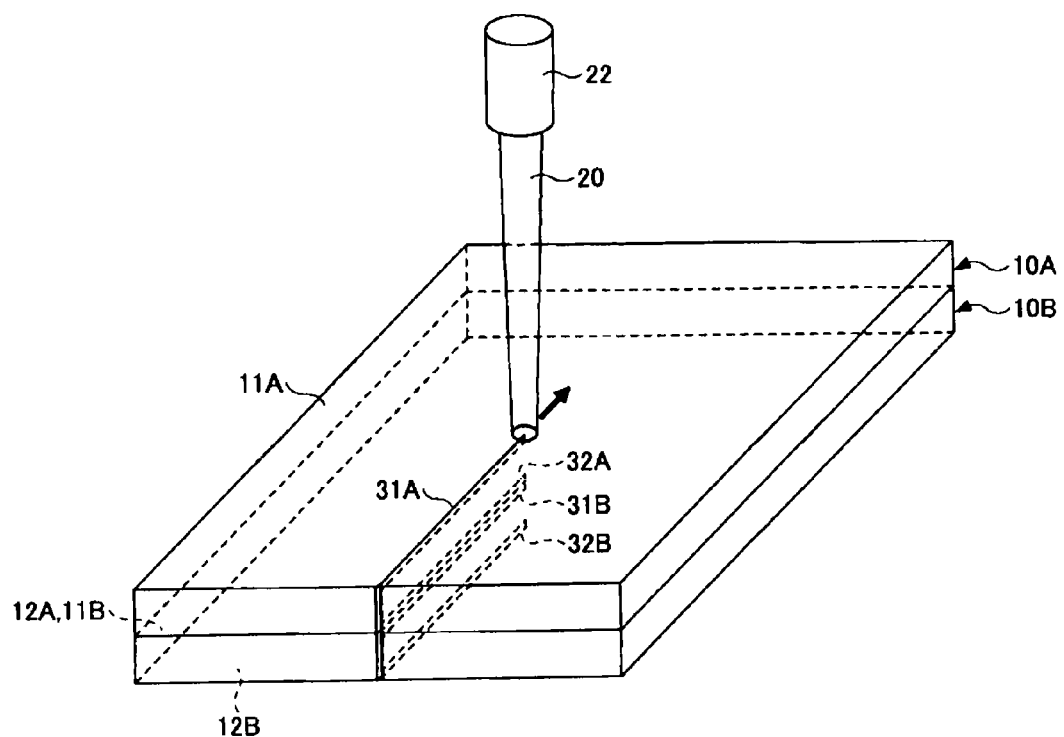
FIG. 12 is a figure illustrating a method for processing a glass sheet according to a fourth embodiment of the present invention.

FIG. 12 is a figure illustrating a method for processing a glass sheet according to the fourth embodiment of the present invention.

The method for processing a glass sheet includes a scribing step of forming scribe lines simultaneously on a plural of glass sheets 10A and 10B. The plural of the glass sheets 10A and 10B may have the same thickness and the same glass composition. The plural of the glass sheets 10A and 10B are laminated to each other and are provided for the scribing step without being bonded to each other.

The plural of the glass sheets 10A and 10B have the same thickness and the same glass composition in this embodiment, but may have different thicknesses or different glass compositions. In addition, the plural of the glass sheets 10A and 10B may be provided for the scribing step in a state of being bonded to each other through an intermediate layer. For example, a liquid crystal panel in which a liquid crystal material is sealed between the plural of the glass sheets, and a glass in which the plural of the glass sheets are bonded to each other by a resin film may be provided for the scribing step.

In the scribing step, the respective glass sheets 10A and 10B are locally heated with laser light 20 which is transmitted through the plural of the glass sheets 10A and 10B from the respective upper surfaces of the plural of the glass sheets 10A and 10B to the respective lower surfaces of the plural of the glass sheets 10A and 10B, and irradiation positions of the laser light 20 on each of the glass sheets 10A and 10B are moved. In this way, in the scribing step, scribe lines 31A and 31B are formed on upper surfaces 11A and 11B of the glass sheets 10A and 10B, respectively, and at the same time, scribe lines 32A and 32B are formed on lower surfaces 12A and 12B of the glass sheets 10A and 10B, respectively. As a result, the same effects as those of the first embodiment are obtained. In addition, in this embodiment, the scribe lines are simultaneously formed on each of the plural of the glass sheets 10A and 10B with the single laser light 20. Therefore, cut surfaces of the plural of the glass sheets 10A and 10B are likely to be flush.

Scribe line forming conditions (for example, a formation position of an initial crack or irradiation conditions of the laser light) of the respective glass sheets 10A and 10B are the same as scribe line forming conditions of the glass sheet 10 according to the first embodiment. In addition, the thermal deformation state of the respective glass sheets 10A and 10B are the same as the thermal deformation state of the glass sheet 10 illustrated in FIGS. 4 and 5.

In the scribing step of this embodiment, as in the first embodiment, the scribe lines are simultaneously formed on the respective upper and lower surfaces of the plural of the glass sheets. However, as in the second embodiment or the third embodiment, the scribe lines may be simultaneously formed on only the respective lower surfaces among the respective upper and lower surfaces of the plural glass sheets.

EXAMPLES

Test Examples 1-1 to 1-5

In Test Examples 1-1 to 1-5, laser light was entered to a rectangular glass sheet (long side: 100 mm, short side: 50 mm, thickness: 1 mm, soda-lime glass manufactured by Asahi Glass Co., Ltd. (trade name: AS)) perpendicularly to an upper surface thereof. As a light source of the laser light, a Yb fiber laser (wavelength: 1070 nm) was used. An absorption coefficient ($\alpha$) of the glass sheet with respect to the laser light was 0.57 cm$^{-1}$, and the value of $\alpha \times M$ was 0.057 (that is, an internal transmittance was 94.5%). On the upper and lower surfaces of the glass sheet, an irradiation shape of the laser light was circular, and an irradiation position of the laser light was moved parallel to the short sides of the glass sheet from one long side to the other long side of the glass sheet. The center of the irradiation position of the laser light was positioned at a position which was at a distance of 10 mm from one short side of the glass sheet (at a distance of 90 mm from the other short side). The initial crack was formed on an end surface of the glass sheet so as to reach the upper and lower surfaces of the glass sheet using a wheel cutter. For the evaluation, whether or not the scribe lines were formed on the upper and lower surfaces of the glass sheet was confirmed by visual inspection.

The other experiment conditions and evaluation results are shown in Table 1. Conditions other than the conditions shown in Table 1 are the same in Test Examples 1-1 to 1-5. In the following respective tables, P represents the output of the light source, and v represents the speed of moving the irradiation position of the laser light on the upper and lower surfaces of the glass sheet. In addition, t represents the thickness (mm) of the glass sheet. The other reference numerals are as described above.

TABLE 1

| | P [W] | v [mm/s] | W1 [mm] | L1 [mm] | W2 [mm] | L2 [mm] | W1/t | W2/t | P1/P2 | Result |
|---|---|---|---|---|---|---|---|---|---|---|
| Ex. 1-1 | 120 | 20 | 0.10 | 0.10 | 0.13 | 0.13 | 0.10 | 0.13 | 1.76 | Scribe line formed on both surfaces |
| Ex. 1-2 | 240 | 20 | 0.50 | 0.50 | 0.53 | 0.53 | 0.50 | 0.53 | 1.19 | Scribe line formed on both surfaces |
| Ex. 1-3 | 300 | 20 | 0.70 | 0.70 | 0.73 | 0.73 | 0.70 | 0.73 | 1.12 | Scribe line formed on both surfaces |
| Ex. 1-4 | 330 | 20 | 1.10 | 1.10 | 1.13 | 1.13 | 1.10 | 1.13 | 1.12 | Scribe line not formed |
| Ex. 1-5 | 340 | 20 | 1.10 | 1.10 | 1.13 | 1.13 | 1.10 | 1.13 | 1.12 | Full cut |

In Test Examples 1-1 to 1-3, W1/t and W2/t were respectively 0.75 or less, and P1/P2 was within a range of 0.5 to 2.0. Therefore, expanded parts of the upper and lower surfaces of the glass sheet were sharp, sufficient tensile stress was generated, and the scribe lines were able to be formed on the upper and lower surfaces of the glass sheet. In Test Example 1-4, the conditions of W1/t and W2/t being 0.75 or less and P1/P2 being within a range of 0.5 to 2.0 were not satisfied. In addition, the conditions of W2/t being 1.00 or less and P1/P2 being less than 1.0 were not also satisfied. Therefore, expanded parts of the upper and lower surfaces of the glass sheet were gentle, sufficient tensile stress was not generated, and the scribe lines were not able to be formed on the upper and lower surfaces of the glass sheet. In Test Example 1-5, the output of the light source was slightly higher than the case of Test Example 1-4, and a crack penetrating the glass sheet in the thickness direction was formed. Accordingly, it was found that, in a case where expanded parts of the upper and lower surfaces of the glass sheet were gentle, when the output of the light source increases, a crack penetrating the glass sheet in the thickness direction was formed. In Test Example 1-5, it is considered that, as in the related art, compression stress was generated mainly at the irradiation position of the laser light on the glass sheet, tensile stress was generated in the vicinity of the backward position of the irradiation position of the laser light on the glass sheet as a counteraction to the compression stress, and thus a crack was formed due to this tensile stress.

Test Examples 2-1 to 2-5

In Test Examples 2-1 to 2-5, laser light was entered to a rectangular glass sheet (long side: 100 mm, short side: 50 mm, thickness: 1.8 mm, soda-lime glass manufactured by Asahi Glass Co., Ltd. (trade name: AS)) perpendicularly to an upper surface thereof. As a light source of the laser light, a Yb fiber laser (wavelength: 1070 nm) was used. An absorption coefficient (α) of the glass sheet with respect to the laser light was 0.57 cm$^{-1}$, and the value of α×M was 0.103 (that is, an internal transmittance was 90.2%). On the upper and lower surfaces of the glass sheet, an irradiation shape of the laser light was circular, and an irradiation position of the laser light was moved parallel to the short sides of the glass sheet from one long side to the other long side of the glass sheet. The center of the irradiation position of the laser light was positioned at a position which was at a distance of 10 mm from one short side of the glass sheet (at a distance of 90 mm from the other short side). The initial crack was formed on an end surface of the glass sheet so as to reach the upper and lower surfaces of the glass sheet using a wheel cutter. For the evaluation, whether or not the scribe lines were formed on the upper and lower surfaces of the glass sheet was confirmed by visual inspection.

The other experiment conditions and evaluation results are shown in Table 2. Conditions other than the conditions shown in Table 2 are the same in Test Examples 2-1 to 2-5.

TABLE 2

| | P [W] | v [mm/s] | W1 [mm] | L1 [mm] | W2 [mm] | L2 [mm] | W1/t | W2/t | P1/P2 | Result |
|---|---|---|---|---|---|---|---|---|---|---|
| Ex. 2-1 | 120 | 20 | 0.20 | 0.20 | 0.25 | 0.25 | 0.11 | 0.14 | 1.76 | Scribe line formed on both surfaces |
| Ex. 2-2 | 180 | 20 | 0.60 | 0.60 | 0.65 | 0.65 | 0.33 | 0.36 | 1.31 | Scribe line formed on both surfaces |
| Ex. 2-3 | 300 | 20 | 1.20 | 1.20 | 1.25 | 1.25 | 0.67 | 0.70 | 1.21 | Scribe line formed on both surfaces |
| Ex. 2-4 | 300 | 20 | 1.80 | 1.80 | 1.85 | 1.85 | 1.00 | 1.03 | 1.17 | Scribe line not formed |
| Ex. 2-5 | 310 | 20 | 1.80 | 1.80 | 1.85 | 1.85 | 1.00 | 1.03 | 1.17 | Full cut |

In Test Examples 2-1 to 2-3, W1/t and W2/t were respectively 0.75 or less, and P1/P2 was within a range of 0.5 to 2.0. Therefore, expanded parts of the upper and lower surfaces of the glass sheet were sharp, sufficient tensile stress was generated, and the scribe lines were able to be formed on the upper and lower surfaces of the glass sheet. In Test Example 2-4, the conditions of W1/t and W2/t being 0.75 or less and P1/P2 being within a range of 0.5 to 2.0 were not satisfied. In addition, the conditions of W2/t being 1.00 or less and P1/P2 being less than 1.0 were not also satisfied. Therefore, expanded parts of the upper and lower surfaces of the glass sheet were gentle, sufficient tensile stress was not generated, and the scribe lines were not able to be formed on the upper and lower surfaces of the glass sheet. In Test Example 2-5, the output of the light source was slightly higher than the case of Test Example 2-4, and a crack penetrating the glass sheet in the thickness direction was formed. Accordingly, it was found that, in a case where expanded parts of the upper and lower surfaces of the glass sheet were gentle, when the output of the light source increases, a crack penetrating the glass sheet in the thickness direction was formed.

Test Example 3-1

In Test Example 3-1, laser light was entered to a rectangular glass sheet (long side: 100 mm, short side: 50 mm, thickness: 3.4 mm) having the same composition as that of a window glass for an automobile manufactured by Asahi Glass Co., Ltd., perpendicularly to an upper surface thereof. As a light source of the laser light, a Yb fiber laser (wavelength: 1070 nm) was used. An absorption coefficient ($\alpha$) of the glass sheet with respect to the laser light was 2.86 cm$^{-1}$, and the value of $\alpha \times M$ was 0.972 (that is, an internal transmittance was 37.8%). On the upper and lower surfaces of the glass sheet, an irradiation shape of the laser light was circular, and an irradiation position of the laser light was moved parallel to the short sides of the glass sheet from one long side to the other long side of the glass sheet. The center of the irradiation position of the laser light was positioned at a position which was at a distance of 10 mm from one short side of the glass sheet (at a distance of 90 mm from the other short side). The initial crack was formed on an end surface of the glass sheet so as to reach the upper and lower surfaces of the glass sheet using a wheel cutter. For the evaluation, whether or not the scribe lines were formed on the upper and lower surfaces of the glass sheet was confirmed by visual inspection.

The other experiment conditions and evaluation results are shown in Table 3.

sheet were sharp, sufficient tensile stress was generated, and the scribe lines were able to be formed on the upper and lower surfaces of the glass sheet.

Test Example 4-1

In Test Example 4-1, two rectangular glass sheets (long side: 100 mm, short side: 50 mm, thickness: 1.0 mm, soda-lime glass manufactured by Asahi Glass Co., Ltd. (trade name: AS)) were laminated to each other, and laser light was perpendicularly entered to an upper surface of each of the glass sheets. As a light source of the laser light, a Yb fiber laser (wavelength: 1070 nm) was used. An absorption coefficient ($\alpha$) of each of the glass sheets with respect to the laser light was 0.57 cm$^{-1}$, and the value of $\alpha \times M$ was 0.057 (that is, an internal transmittance was 94.5%). On the upper and lower surfaces of each of the glass sheets, an irradiation shape of the laser light was circular, and an irradiation position of the laser light was moved parallel to the short sides of each of the glass sheets from one long side to the other long side of each of the glass sheets. The center of the irradiation position of the laser light was positioned at a position which was at a distance of 10 mm from one short side of each of the glass sheets (at a distance of 90 mm from the other short side). The initial crack was formed on an end surface of each of the glass sheets so as to reach the upper and lower surfaces of each of the glass sheets using a wheel cutter. For the evaluation, whether or not the scribe lines were formed on the upper and lower surfaces of each of the glass sheets was confirmed by visual inspection.

The other experiment conditions and evaluation results are shown in Table 4. In Table 4, Sheet No. of the glass sheet represents the order in which the laser light is transmitted. The

TABLE 3

| | P [W] | v [mm/s] | W1 [mm] | L1 [mm] | W2 [mm] | L2 [mm] | W1/t | W2/t | P1/P2 | Result |
|---|---|---|---|---|---|---|---|---|---|---|
| Ex. 3-1 | 30 | 10 | 1.64 | 1.64 | 0.96 | 0.96 | 0.48 | 0.28 | 0.91 | Scribe line formed on both surfaces |

In Test Example 3-1, W1/t and W2/t were respectively 0.75 or less, and P1/P2 was within a range of 0.5 to 2.0. Therefore, expanded parts of the upper and lower surfaces of the glass laser light was transmitted through the glass sheet of Sheet No. 1 and then was transmitted through the glass sheet of Sheet No. 2.

TABLE 4

| | P [W] | v [mm/s] | Sheet No. | W1 [mm] | L1 [mm] | W2 [mm] | L2 [mm] | W1/t | W2/t | P1/P2 |
|---|---|---|---|---|---|---|---|---|---|---|
| Ex. 4-1 | 140 | 20 | 1 | 0.20 | 0.20 | 0.23 | 0.23 | 0.20 | 0.23 | 1.39 |
| | | | 2 | 0.23 | 0.23 | 0.26 | 0.26 | 0.23 | 0.26 | 1.34 |

| | P [W] | v [mm/s] | Sheet No. | Result |
|---|---|---|---|---|
| Ex. 4-1 | 140 | 20 | 1 | Scribe line formed on both surfaces |
| | | | 2 | Scribe line formed on both surfaces |

In Test Example 4-1, W1/t and W2/t were respectively 0.75 or less, and P1/P2 was within a range of 0.5 to 2.0. Therefore, expanded parts of the upper and lower surfaces of each of the glass sheets were sharp, sufficient tensile stress was generated, and the scribe lines were able to be formed on the upper and lower surfaces of each of the glass sheets.

Test Examples 5-1 to 5-3

In Test Examples 5-1 to 5-3, laser light was entered to a rectangular glass sheet (long side: 100 mm, short side: 50 mm, thickness: 2.0 mm) having the same composition as that of a window glass for an automobile manufactured by Asahi Glass Co., Ltd., perpendicularly to an upper surface thereof. As a light source of the laser light, a Yb fiber laser (wavelength: 1070 nm) was used. An absorption coefficient ($\alpha$) of the glass sheet with respect to the laser light was 2.86 cm$^{-1}$, and the value of $\alpha \times M$ was 0.572 (that is, an internal transmittance was 56.4%). On the upper and lower surfaces of the glass sheet, an irradiation shape of the laser light was elliptical (a short axis faces the moving direction of the irradiation position), and an irradiation position of the laser light was moved parallel to the short sides of the glass sheet from one long side to the other long side of the glass sheet. The center of the irradiation position of the laser light was positioned at a position which was at a distance of 15 mm from one short side of the glass sheet (at a distance of 85 mm from the other short side). The initial crack was formed on an end surface of the glass sheet so as to reach the upper and lower surfaces of the glass sheet using a wheel cutter. For the evaluation, whether or not the scribe lines were formed on the upper and lower surfaces of the glass sheet was confirmed by visual inspection.

The other experiment conditions and evaluation results are shown in Table 5. Conditions other than the conditions shown in Table 5 are the same in Test Examples 5-1 to 5-3.

TABLE 5

| | P [W] | v [mm/s] | W1 [mm] | L1 [mm] | W2 [mm] | L2 [mm] | W1/t | W2/t | P1/P2 | Result |
|---|---|---|---|---|---|---|---|---|---|---|
| Ex. 5-1 | 30 | 10 | 1.28 | 0.86 | 0.96 | 0.64 | 0.64 | 0.48 | 1.00 | Scribe line formed on both surfaces |
| Ex. 5-2 | 30 | 10 | 2.30 | 0.86 | 1.98 | 0.64 | 1.15 | 0.99 | 1.15 | Scribe line not formed |
| Ex. 5-3 | 35 | 10 | 2.30 | 0.86 | 1.98 | 0.64 | 1.15 | 0.99 | 1.15 | Full cut |

In Test Example 5-1, W1/t and W2/t were respectively 0.75 or less, and P1/P2 was within a range of 0.5 to 2.0. Therefore, expanded parts of the upper and lower surfaces of the glass sheet were sharp, sufficient tensile stress was generated, and the scribe lines were able to be formed on the upper and lower surfaces of the glass sheet. In Test Example 5-2, the conditions of W1/t and W2/t being 0.75 or less and P1/P2 being within a range of 0.5 to 2.0 were not satisfied. In addition, the conditions of W2/t being 1.00 or less and P1/P2 being less than 1.0 were not also satisfied. Therefore, expanded parts of the upper and lower surfaces of the glass sheet were gentle, sufficient tensile stress was not generated, and the scribe lines were not able to be formed on the upper and lower surfaces of the glass sheet. In Test Example 5-3, the output of the light source was slightly higher than the case of Test Example 5-2, and a crack penetrating the glass sheet in the thickness direction was formed. Accordingly, it was found that, in a case where expanded parts of the upper and lower surfaces of the glass sheet were gentle, when the output of the light source increases, a crack penetrating the glass sheet in the thickness direction was formed.

Test Examples 6-1 to 6-3

In Test Examples 6-1 to 6-3, laser light was entered to a rectangular glass sheet (long side: 100 mm, short side: 50 mm, thickness: 2.0 mm) having the same composition as that of a window glass for an automobile manufactured by Asahi Glass Co., Ltd., perpendicularly to an upper surface thereof. As a light source of the laser light, a Yb fiber laser (wavelength: 1070 nm) was used. An absorption coefficient ($\alpha$) of the glass sheet with respect to the laser light was 2.86 cm$^{-1}$, and the value of $\alpha \times M$ was 0.572 (that is, an internal transmittance was 56.4%). On the upper and lower surfaces of the glass sheet, an irradiation shape of the laser light was elliptical (a long axis faces the moving direction of the irradiation position), the moving direction of the irradiation position was parallel to the short sides of the glass sheet, and the center of the irradiation position of the laser light was positioned at a position which was at a distance of 15 mm from one short side of the glass sheet (at a distance of 85 mm from the other short side). The initial crack was formed on an end surface of the glass sheet so as to reach the upper and lower surfaces of the glass sheet using a wheel cutter. For the evaluation, whether or not the scribe lines were formed on the upper and lower surfaces of the glass sheet was confirmed by visual inspection.

The other experiment conditions and evaluation results are shown in Table 6. Conditions other than the conditions shown in Table 6 are the same in Test Examples 6-1 to 6-3.

TABLE 6

| | P [W] | v [mm/s] | W1 [mm] | L1 [mm] | W2 [mm] | L2 [mm] | W1/t | W2/t | P1/P2 | Result |
|---|---|---|---|---|---|---|---|---|---|---|
| Ex. 6-1 | 60 | 20 | 1.40 | 2.80 | 1.19 | 2.49 | 0.70 | 0.59 | 1.33 | Scribe line formed on both surfaces |
| Ex. 6-2 | 60 | 20 | 2.20 | 2.80 | 1.99 | 2.49 | 1.10 | 1.00 | 1.42 | Scribe line not formed |
| Ex. 6-3 | 70 | 20 | 2.20 | 2.80 | 1.99 | 2.49 | 1.10 | 1.00 | 1.42 | Full cut |

In Test Example 6-1, W1/t and W2/t were respectively 0.75 or less, and P1/P2 was within a range of 0.5 to 2.0. Therefore, expanded parts of the upper and lower surfaces of the glass sheet were sharp, sufficient tensile stress was generated, and the scribe lines were able to be formed on the upper and lower surfaces of the glass sheet. In Test Example 6-2, the conditions of W1/t and W2/t being 0.75 or less and P1/P2 being within a range of 0.5 to 2.0 were not satisfied. In addition, the conditions of W2/t being 1.00 or less and P1/P2 being less than 1.0 were not also satisfied. Therefore, expanded parts of the upper and lower surfaces of the glass sheet were gentle, sufficient tensile stress was not generated, and the scribe lines were not able to be formed on the upper and lower surfaces of the glass sheet. In Test Example 6-3, the output of the light source was slightly higher than the case of Test Example 6-2, and a crack penetrating the glass sheet in the thickness direction was formed. Accordingly, it was found that, in a case where expanded parts of the upper and lower surfaces of the glass sheet were gentle, when the output of the light source increases, a crack penetrating the glass sheet in the thickness direction was formed.

Test Examples 7-1 to 7-5

In Test Examples 7-1 to 7-5, laser light was entered to a rectangular glass sheet (long side: 100 mm, short side: 50 mm, thickness: 1.1 mm, soda-lime glass manufactured by Asahi Glass Co., Ltd. (trade name: AS)) perpendicularly to an upper surface thereof. As a light source of the laser light, a Yb fiber laser (wavelength: 1070 nm) was used. An absorption coefficient ($\alpha$) of the glass sheet with respect to the laser light was 0.57 cm$^-$, and the value of $\alpha \times M$ was 0.063 (that is, an internal transmittance was 93.9%). On the upper and lower surfaces of the glass sheet, an irradiation shape of the laser light was circular, and an irradiation position of the laser light was moved parallel to the short sides of the glass sheet from one long side to the other long side of the glass sheet. The center of the irradiation position of the laser light was positioned at a position which was at a distance of 15 mm from one short side of the glass sheet (at a distance of 85 mm from the other short side). The initial crack was formed on an end surface of the glass sheet so as to reach the upper and lower surfaces of the glass sheet using a wheel cutter. For the evaluation, whether or not the scribe lines were formed on the upper and lower surfaces of the glass sheet was confirmed by visual inspection.

The other experiment conditions and evaluation results are shown in Table 7. Conditions other than the conditions shown in Table 7 are the same in Test Examples 7-1 to 7-5.

In Test Examples 7-1 and 7-2, W1/t and W2/t were respectively 0.75 or less, and P1/P2 was within a range of 0.5 to 2.0. Therefore, expanded parts of the upper and lower surfaces of the glass sheet were sharp, sufficient tensile stress was generated, and the scribe lines were able to be formed on the upper and lower surfaces of the glass sheet. In Test Example 7-3, W1/t and W2/t were respectively within a range of 0.75 to 1.00, and P1/P2 was less than 1.0. Therefore, an expanded part of the lower surfaces of the glass sheet was sharper than an expanded part of the upper surfaces of the glass sheet, and the scribe line was able to be formed on only the lower surface of the upper and lower surfaces of the glass sheet. In Test Example 7-4, the conditions of W1/t and W2/t being 0.75 or less and P1/P2 being within a range of 0.5 to 2.0 were not satisfied. In addition, the conditions of W2/t being 1.00 or less and P1/P2 being less than 1.0 were not also satisfied. Therefore, expanded parts of the upper and lower surfaces of the glass sheet were gentle, sufficient tensile stress was not generated, and the scribe lines were not able to be formed on the upper and lower surfaces of the glass sheet. In Test Example 7-5, the output of the light source was slightly higher than the case of Test Example 7-4, and a crack penetrating the glass sheet in the thickness direction was formed. Accordingly, it was found that, in a case where expanded parts of the upper and lower surfaces of the glass sheet were gentle, when the output of the light source increases, a crack penetrating the glass sheet in the thickness direction was formed.

Test Examples 8-1 to 8-3

In Test Examples 8-1 to 8-3, laser light was entered to a rectangular glass sheet (long side: 100 mm, short side: 50 mm, thickness: 1.1 mm, soda-lime glass manufactured by Asahi Glass Co., Ltd. (trade name: AS)) perpendicularly to an upper surface thereof. As a light source of the laser light, a Yb fiber laser (wavelength: 1070 nm) was used. An absorption coefficient ($\alpha$) of the glass sheet with respect to the laser light was 0.57 cm$^{-1}$, and the value of $\alpha \times M$ was 0.063 (that is, an internal transmittance was 93.9%). On the upper and lower surfaces of the glass sheet, an irradiation shape of the laser light was circular, and an irradiation position of the laser light was moved parallel to the long sides of the glass sheet from a position, which was at a distance of 10 mm from one short side of the glass sheet, to the other short side of the glass sheet. The center of the irradiation position of the laser light was positioned at a position which was at a distance of 10 mm from one long side of the glass sheet (at a distance of 40 mm from the other long side). For the evaluation, whether or not

TABLE 7

| | P [W] | v [mm/s] | W1 [mm] | L1 [mm] | W2 [mm] | L2 [mm] | W1/t | W2/t | P1/P2 | Result |
|---|---|---|---|---|---|---|---|---|---|---|
| Ex. 7-1 | 200 | 20 | 0.70 | 0.70 | 0.63 | 0.63 | 0.64 | 0.57 | 0.86 | Scribe line formed on both surfaces |
| Ex. 7-2 | 200 | 20 | 0.80 | 0.80 | 0.73 | 0.73 | 0.73 | 0.66 | 0.89 | Scribe line formed on both surfaces |
| Ex. 7-3 | 240 | 20 | 1.00 | 1.00 | 0.93 | 0.93 | 0.91 | 0.85 | 0.92 | Scribe line formed on lower surface |
| Ex. 7-4 | 280 | 20 | 1.20 | 1.20 | 1.13 | 1.13 | 1.09 | 1.03 | 0.94 | Scribe line not formed |
| Ex. 7-5 | 300 | 20 | 1.20 | 1.20 | 1.13 | 1.13 | 1.09 | 1.03 | 0.94 | Full cut | the scribe lines were formed on the upper and lower surfaces of the glass sheet was confirmed by visual inspection.

The other experiment conditions and evaluation results are shown in Table 8. Conditions other than the conditions shown in Table 8 are the same in Test Examples 8-1 to 8-3. In Test Examples 8-1 and 8-2, a wheel cutter was pressed against the glass sheet to form an initial crack. In Test Example 8-1, a formation position of the initial crack was at a part of the glass sheet 10, which was positioned inside an outer periphery of each of the upper and lower surfaces, and was at a distance of 20 mm from one short side of the glass sheet. In Test Example 8-2, a formation position of the initial crack was at a part of the glass sheet, which was positioned inside an outer periphery of the lower surface, and was at a distance of 20 mm from one short side of the glass sheet. In Test Examples 8-1 and 8-2, an end surface of the glass sheet was a cut surface which was cut by the laser light, and did not have an initial crack such as a micro crack. On the other hand, in Test Example 8-3, an initial crack was not formed on all the surfaces of the glass sheet. In Test Example 8-3, an end surface of the glass sheet was a cut surface which was cut by the laser light, and did not have an initial crack such as a micro crack.

Test Examples 9-1 to 9-4

In Test Examples 9-1 to 9-4, laser light was entered to a rectangular glass sheet (long side: 100 mm, short side: 50 mm, thickness: 1.1 mm, soda-lime glass manufactured by Asahi Glass Co., Ltd. (trade name: AS)) perpendicularly to an upper surface thereof. As a light source of the laser light, a Yb fiber laser (wavelength: 1070 nm) was used. An absorption coefficient ($\alpha$) of the glass sheet with respect to the laser light was 0.57 cm$^{-1}$, and the value of $\alpha \times M$ was 0.063 (that is, an internal transmittance was 93.9%). On the upper and lower surfaces of the glass sheet, an irradiation shape of the laser light was circular, and an irradiation position of the laser light was moved parallel to the short sides of the glass sheet from one long side to the other long side of the glass sheet. The center of the irradiation position of the laser light was positioned at a position which was at a distance of 10 mm from one short side of the glass sheet (at a distance of 90 mm from the other short side). For the evaluation, whether or not the scribe lines were formed on the upper and lower surfaces of the glass sheet was confirmed by visual inspection.

The other experiment conditions and evaluation results are shown in Table 9. Conditions other than the conditions shown in Table 9 are the same in Test Examples 9-1 to 9-4. In Test Examples 9-1 and 9-3, a wheel cutter was pressed against the glass sheet to form an initial crack. In Test Example 9-1, a

TABLE 8

| | P [W] | v [mm/s] | W1 [mm] | L1 [mm] | W2 [mm] | L2 [mm] | W1/t | W2/t | P1/P2 | Initial Crack Position | Result |
|---|---|---|---|---|---|---|---|---|---|---|---|
| Example 8-1 | 280 | 20 | 0.60 | 0.60 | 0.63 | 0.63 | 0.55 | 0.57 | 1.18 | Upper surface and lower surface (except outer periphery) | Scribe line formed on both surfaces |
| Example 8-2 | 280 | 20 | 0.60 | 0.60 | 0.63 | 0.63 | 0.55 | 0.57 | 1.18 | Lower surface (except outer periphery) | Scribe line formed on lower surface |
| Example 8-3 | 280 | 20 | 0.60 | 0.60 | 0.63 | 0.63 | 0.55 | 0.57 | 1.18 | — | Scribe line not formed |

In Test Example 8-1, W1/t and W2/t were respectively 0.75 or less, and P1/P2 was within a range of 0.5 to 2.0. Therefore, expanded parts of the upper and lower surfaces of the glass sheet which were formed by laser heating were sharp, sufficient tensile stress was generated, and the scribe lines were able to be formed on the upper and lower surfaces of the glass sheet.

In Test Example 8-2, unlike the case of Test Example 7-3, the initial crack was formed on the part of the glass sheet which was positioned inside the outer periphery of the lower surface. Therefore, although P1/P2 was not less than 1.0, the scribe line was able to be formed on only the lower surface of the upper and lower surfaces of the glass sheet. On the other hand, in Test Example 8-3, the initial crack was not formed, and thus, the scribe line was not able to be formed.

formation position of the initial crack was at an upper part of the end surface of the glass sheet. In Test Example 9-2, a formation position of the initial crack was at a lower part of the end surface of the glass sheet. In Test Example 9-3, a formation position of the initial crack was at the center of the end surface of the glass sheet in the upward direction. In Test Examples 9-1 to 9-3, an end surface of the glass sheet was a cut surface which was cut by the laser light, and did not have an initial crack such as a micro crack except a position where the wheel cut was pressed. In Test Example 9-4, an initial crack was not formed on all the surfaces of the glass sheet. In Test Example 9-4, an end surface of the glass sheet was a cut surface which was cut by the laser light, and did not have an initial crack such as a micro crack.

TABLE 9

| | P [W] | v [mm/s] | W1 [mm] | L1 [mm] | W2 [mm] | L2 [mm] | W1/t | W2/t | P1/P2 | Initial Crack Position | Result |
|---|---|---|---|---|---|---|---|---|---|---|---|
| Example 9-1 | 280 | 20 | 0.60 | 0.60 | 0.63 | 0.63 | 0.55 | 0.57 | 1.18 | Upper part of end surface | Scribe lines formed on both surfaces |
| Example 9-2 | 280 | 20 | 0.60 | 0.60 | 0.63 | 0.63 | 0.55 | 0.57 | 1.18 | Lower part of end surface | Scribe lines formed on both surfaces |
| Example 9-3 | 280 | 20 | 0.60 | 0.60 | 0.63 | 0.63 | 0.55 | 0.57 | 1.18 | Center of end surface | Scribe lines formed on both surfaces |
| Example 9-4 | 280 | 20 | 0.60 | 0.60 | 0.63 | 0.63 | 0.55 | 0.57 | 1.18 | — | Scribe line not formed |

In Test Examples 9-1 to 9-3, W1/t and W2/t were respectively 0.75 or less, and P1/P2 was within a range of 0.5 to 2.0. Therefore, expanded parts of the upper and lower surfaces of the glass sheet were sharp, sufficient tensile stress was generated, and the scribe lines were able to be formed on the upper and lower surfaces of the glass sheet. A position of the initial crack was good in any one of an upper part of the end surface of the glass sheet, a lower part of the end surface of the glass sheet, and the center of the end surface of the glass sheet. On the other hand, in Test Example 9-4, the initial crack was not formed, and thus, the scribe line was not able to be formed.

Hereinabove, the embodiments of the method for processing a glass sheet have been described. However, the present invention is not limited to the above-described embodiments, and various modifications and improvements can be made within a range not departing from the claims.

For example, the glass sheet may be irradiated with a plural of laser lights for forming scribe lines on the upper and lower surfaces of the glass sheet 10.

In addition, the glass sheet 10 may be flat or curved.

In addition, the first main surface of the glass sheet 10 and the second main surface of the glass sheet 10 may be replaced with each other. That is, a scribe line may be formed on at least the upper surface 11 of the glass sheet 10 with the laser light 20 which is transmitted through the glass sheet 10 from the lower surface 12 of the glass sheet 10 to the upper surface 11 of the glass sheet 10. For example, after the glass sheet 10 which is adsorbed on a lower surface of an adsorption sheet is irradiated from below with the laser light 20 to form a scribe line on the upper surface of the glass sheet 10, a part of the glass sheet 10 may be pushed up from below to cut the glass sheet 10 along the scribe line. After the formation of the scribe line, it is not necessary to turn the glass sheet 10 over.

Using laser light which is transmitted through the glass sheet 10 from the first main surface (for example, the upper surface) of the glass sheet 10 to the second main surface (for example, the lower surface) of the glass sheet 10, a scribe line may also be formed on only the first main surface of the first main surface and second main surface of the glass sheet 10. In this case, the initial crack may be formed on a part which is positioned inside an outer periphery of the first main surface. In addition, in this case, P1/P2 may be higher than 1.0.

In addition, the irradiation position of the laser light 20 may be cooled by blowing air thereto. Using a cooling nozzle, gas is blown to a surface of the glass sheet 10 where a scribe line is formed. For example, when the scribe line is formed on only the lower surface 12 as in the above-described first embodiment or third embodiment, air is blown to the irradiation position of the laser light 20 on the lower surface 12. In the cooling nozzle, a tapered cavity is formed such that gas (for example, air or nitrogen) flows through the inside thereof. Here, when the scribe line is formed on an incident surface of the laser light 20 (for example, the upper surface) as in the above-described first embodiment, the axis of the cooling nozzle matches with the optical axis of the laser light 20, and the laser light 20 condensed by the lens is transmitted through the inside of the cooling nozzle and is emitted from an opening having a diameter φn which is provided at a front end of the cooling nozzle 28. In addition, the cooling nozzle can be moved in synchronization with the movement of the irradiation area of the laser light 20 (that is, at the same scanning speed as that of the laser light). In such a configuration, the irradiation position of the laser light 20 is cooled by the gas. Due to this cooling, tensile stress is likely to be generated at the irradiation position of the laser light. That is, a scribe line is likely to be formed, and stable processing can be performed.

The flow rate of cooling gas, the diameter φn of the opening of the cooling nozzle, and a gap between the front end of the cooling nozzle and the glass sheet 10 can be arbitrarily determined. Here, as the diameter φn of the opening of the cooling nozzle decreases, the flow rate of the gas blown to the glass sheet 10 increases, and the cooling ability on the glass sheet 10 is improved. In addition, as the gap between the front end of the cooling nozzle and the glass sheet 10 decreases, the cooling ability on the glass sheet 10 is improved. For example, cooling air of room temperature may be blown to a laser irradiation part having a beam diameter of 0.3 mm using a cooling nozzle having a diameter φn of 1 mm at a flow rate of 20 L/min.

Thus far, the prevent invention has been described in accordance with the above-described embodiments, but the present invention is not limited to the constitutions of the embodiments, and it is needless to say that a variety of modifications, corrections, and combinations that can be made by those skilled in the art can be made within the scope of the inventions in the claims of the present application.

The present application is based on Japanese Patent Application No. 2012-154968 filed on Jul. 10, 2012, and Japanese Patent Application No. 2013-045102 filed on Mar. 7, 2013, the contents of which are incorporated herein by reference.

INDUSTRIAL APPLICABILITY

According to the present invention, a method for processing a glass sheet, which is capable of cutting a glass sheet without turning the glass sheet over after the formation of a scribe line, is provided.

REFERENCE SIGNS LIST 10, 10A, 10B: Glass sheet
11, 11A, 11B: Upper surface
12, 12A, 12B: Lower surface
20: Laser light
22: Light source
31, 31A, 31B: Scribe line
32, 32A, 32B: Scribe line
33: Initial crack
34: Initial crack
35: Scribe line

The invention claimed is:

1. A method for processing a glass sheet, comprising:
scribing by heating a part of a glass sheet with laser light which is transmitted through the glass sheet from a first main surface of the glass sheet to a second main surface of the glass sheet,
and moving an irradiation position of the laser light on the glass sheet, thereby forming a scribe line on at least the second main surface of the glass sheet,
wherein a heating temperature of the glass sheet is a temperature lower than or equal to the annealing point of the glass sheet.

2. The method for processing a glass sheet according to claim 1,
wherein in the scribing, a part of the second main surface of the glass sheet is heated with the laser light to be expanded, and the scribe line is formed on the second main surface of the glass sheet by a tensile stress of the second main surface.

3. The method for processing a glass sheet according to claim 2, wherein the tensile stress is generated in a direction perpendicular to a moving direction of the irradiation position of the laser light.

4. The method for processing a glass sheet according to claim 1, wherein in the scribing, by the laser light which is transmitted through the glass sheet from the first main surface of the glass sheet to the second main surface of the glass sheet, the scribe line is formed on the second main surface of the glass sheet and a scribe line is formed on the first main surface of the glass sheet.

5. The method for processing a glass sheet according to claim 4, wherein an initial crack which is an origin of the scribe line is formed on at least one of both surfaces including the first main surface of the glass sheet and the second main surface of the glass sheet and an end surface of the glass sheet.

6. The method for processing a glass sheet according to claim 1, wherein in the scribing, by the laser light which is transmitted through the glass sheet from the first main surface of the glass sheet to the second main surface of the glass sheet, the scribe line is formed on only the second main surface of the first main surface of the glass sheet and the second main surface of the glass sheet.

7. The method for processing a glass sheet according to claim 6, wherein
an initial crack which is an origin of the scribe line is formed on the end surface of the glass sheet, and
a ratio Pl/P2 of a power density P1 of the laser light on the first main surface of the glass sheet to a power density P2 of the laser light on the second main surface of the glass sheet is less than 1.0.

8. The method for processing a glass sheet according to claim 7, wherein the ratio P1/P2 is 0.001 or more.

9. The method for processing a glass sheet according to claim 6, wherein an initial crack which is an origin of the scribe line is formed on only a part of the glass sheet which is positioned inside an outer periphery of the second main surface.

10. The method for processing a glass sheet according to claim 1, wherein in the scribing, by the laser light which is transmitted through a plurality of glass sheets from respective first main surfaces of the plurality of glass sheets to respective second main surfaces of the plurality of glass sheets, scribe lines are simultaneously formed on at least the respective second main surfaces of the plurality of glass sheets.

11. The method for processing a glass sheet according to claim 1, wherein in the scribing, a plurality of scribe lines which intersect with each other are formed.

12. The method for processing a glass sheet according to claim 1, wherein in the scribing, a scribe line having a plurality of parts which intersect with each other is formed.

13. The method for processing a glass sheet according to claim 1, wherein a wavelength of the laser light is 250 nm to 5000 nm.

14. The method for processing a glass sheet according to claim 1, wherein a shape of the laser light on the second main surface of the glass sheet is circular.

15. The method for processing a glass sheet according to claim 1, wherein W1/t and W2/t is respectively 0.75 or less.

16. The method for processing a glass sheet according to claim 1, wherein a ratio Pl/P2 of a power density P1 of the laser light on the first main surface of the glass sheet to a power density P2 of the laser light on the second main surface of the glass sheet is from 0.5 to 2.0.

17. The method for processing a glass sheet according to claim 1, wherein a front end of the scribe line is present at the irradiation position of the laser light.

\* \* \* \* \*